Feb. 10, 1925.
F. GARONE
1,525,646
SUPPORT FOR AUTOMOBILE BUMPERS
Filed March 24, 1923
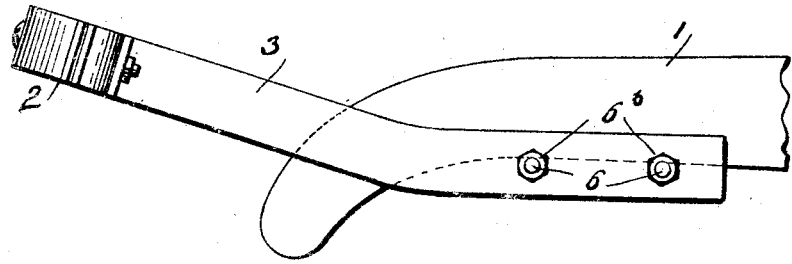
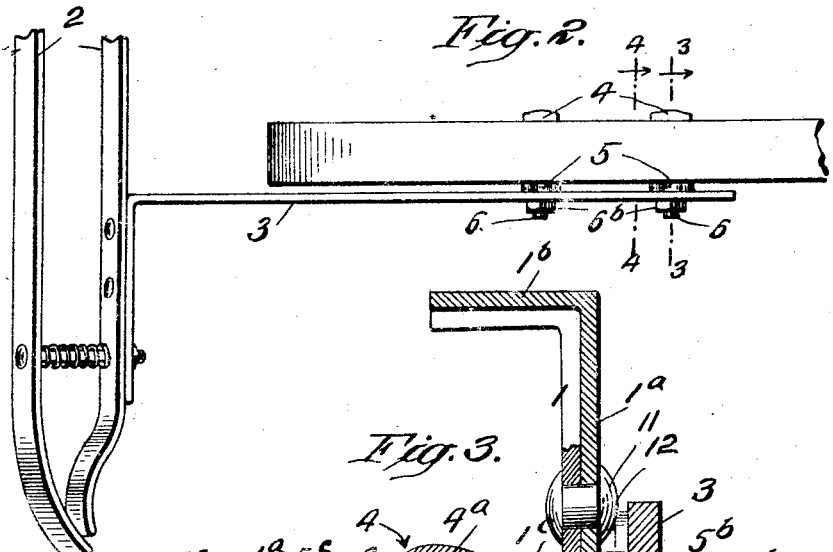
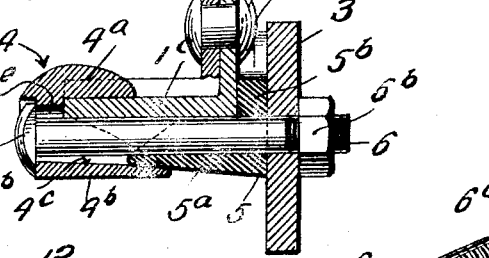
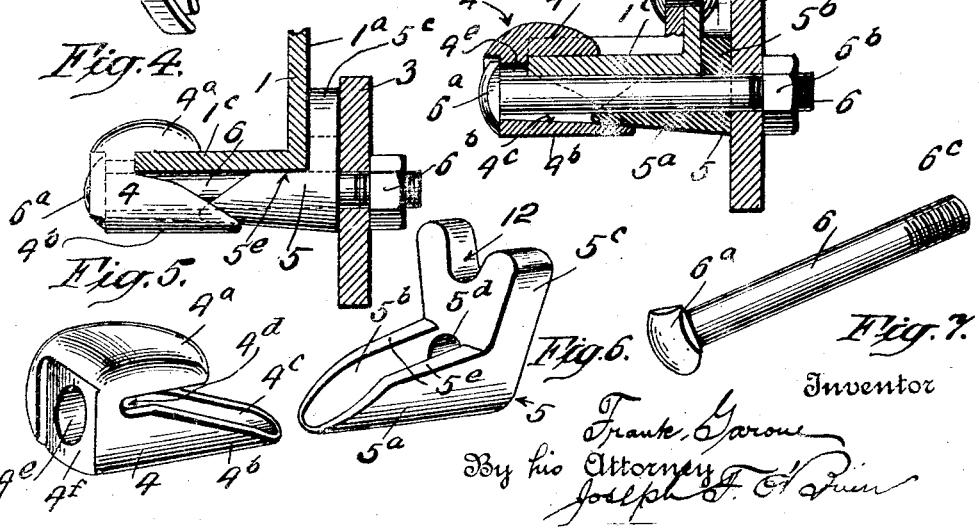
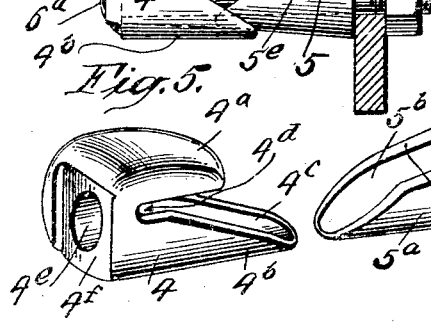
Inventor
Frank Garone
By his Attorney
Joseph F. O'Brien Patented Feb. 10, 1925.

1,525,646

UNITED STATES PATENT OFFICE.

FRANK GARONE, OF BROOKLYN, NEW YORK, ASSIGNOR TO NEW YORK WIRE & SPRING COMPANY, A CORPORATION OF NEW JERSEY.

SUPPORT FOR AUTOMOBILE BUMPERS.

Application filed March 24, 1923. Serial No. 627,277.

*To all whom it may concern:*

Be it known that I, FRANK GARONE, a subject of the King of Italy, and a resident of the borough of Brooklyn, city of New York, county of Kings, and State of New York, have invented certain new and useful Improvements in Supports for Automobile Bumpers, of which the following is a specification.

This invention relates to improvements in supports for automobile bumpers.

One of the objects of my invention is to provide a support for automobile bumpers by which such bumpers may be readily and quickly mounted on the chassis of the car and rigidly retained in position thereon.

Another object of my invention is to produce a support or attaching device for each side of a bumper composed of a bracket bar and clamps, each having means for applying clamping pressure on the frame ends of the automobile chassis in two directions and having four contact points therewith so as to procure and maintain a firm hold thereon, and also furnishing a firm support for the supporting bar.

Another object of my invention is to produce a clamp which may, by the same operation, apply clamping pressure in two directions on the frame ends and fasten the attaching bar rigidly in place.

Another object of my invention is to produce a clamp having a bolt and clamping members so arranged that in one operation the tightening of the nut on the bolt will cause a wedging action of the clamping parts on the frame ends and also apply pressure thereto at substantially right angles to the direction of the wedging pressure and furthermore the tightening of the said nut also preferably simultaneously fastens the supporting or attaching bar of the bumper to the frame ends.

Another object of my invention is to provide a bumper support which will be light, easy and cheap to manufacture and easy to instal, and which when installed will be extremely rigid and durable.

Another object of my invention is to provide a bumper support which is substantially universal and may be applied to many different types of automobiles.

Another object of my invention is to enable the attachment of a bumper to the chassis with a minimum number of operations.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is an end elevation of a bumper and frame end or rail of a motor vehicle;

Fig. 2 is a fragmentary plan view illustrating the supporting bar attached by clamps at one side of the car to one of the frame ends or rails of a motor vehicle;

Fig. 3 is a section through the clamp on the line 3—3 of Fig. 2;

Fig. 4 is a section similar to Fig. 3 on the line 4—4 of Fig. 2, the section being taken at one side of the clamp;

Fig. 5 is a perspective view of one of the clamping members;

Fig. 6 is a similar view of another member; and

Fig. 7 is a similar view of the clamp bolt.

Referring now to these drawings, which illustrate a preferred embodiment of my invention, 1 indicates one of the two parallel outwardly-extending frame ends or rails at the front end of the chassis of a motor vehicle. These frame ends are usually curved or inclined downwardly. The remaining parts of the vehicle are not illustrated because they form no part of this invention. The frame ends 1 are usually of channelled cross-section, as indicated in Fig. 3, to provide a web portion 1$^a$ and top and bottom flanges 1$^b$—1$^c$.

2 indicates a bumper of any suitable type which it is desired to mount on said frame ends or rails, and in the embodiment shown the said bumper 2 may be attached in any suitable manner to a pair of outwardly-extending supporting or attaching bars 3, only one of which bars is illustrated, it being understood, of course, that a similar bar similarly disposed will be similarly supported and attached at the opposite side of the vehicle. Each of such supporting bars 3 is secured to the frame ends or rails by clamps 4, and as shown is so secured by two independent identical clamps 4, which are adapted to be fastened to the frame ends or rails by connection with either one of the flanges 1$^b$ or 1$^c$ and with the web 1$^a$ of said end bar. Each of such clamps is adapted to apply pressure on said end bar in two directions, viz, from opposite faces of said flange and from opposite edges, and at the same time to clamp the bar 3 in place on such end, all preferably by a single operation. These clamps preferably embody means for simultaneously wedging the clamp against the opposite faces of the flange of the frame end or rail and simultaneously applying an edgewise screw pressure by contact at one side with the outer edge of the flange and at the other side with the web contiguous to said flange, and preferably the clamps are fastened and the supporting or attaching bar is connected to the frame ends or rails by the simple operation of fastening two clamps in place.

A detailed description of one of the clamps will suffice for all.

Each of the clamps 4 preferably comprises a U-shaped hook member adapted to be slipped over the inside edge of one of the flanges; a wedge member 5 adapted to engage the U-shaped hook member and to cause clamping pressure to be applied on the faces of said flange when the parts are forced toward each other and a common bolt 6 on which said two parts are mounted. As illustrated, the hook-member has a seat 4$^d$ for the reception of the edge of the flange 1$^c$ between a bill-portion 4$^a$ and shank portion 4$^b$ which is provided with a semi-cylindrical longitudinally-extending groove 4$^c$ communicating with a circular bolt hole or opening 4$^e$ which has at its outer side a depressed seat 4$^f$ square in configuration for the square head 6$^a$ of said bolt 6, and said socket preferably has an inclined inner surface 4$^g$ and the wedge-member 5 comprises a semi-cylindrical wedge portion 5$^a$ having a semi-cylindrical groove 5$^b$ for the reception of the rear portion of the shank of the bolt and a back-portion 5$^c$ having a bolt hole 5$^d$ in alignment with the groove 5$^b$ and through which the bolt extends and on the rear side of which the nut 6$^b$ is threaded on the bolt thread 6$^c$. As shown, the hook member and wedge member are arranged to be moved telescopically by the screwing up of the nut on the bolt, so that by such a telescoping movement of the parts, a wedging action may be procured by a screwing on of the nut. Such movement will, when the parts are in place on a flange of the frame ends or channel-shaped rail, cause a simultaneous wedging action by the hook and wedge members against opposite faces of the flange as well as an exertion of edgewise screw pressure against the edge of the flange at one side and the web on the opposite side. In this way the clamps 4, two of which are employed on each flange, form a rigid support for the supporting or attaching bar 3 which is preferably inserted between the back of the wedging member 5 and the nut 6 so as to securely fasten the said bar 3 in place. The square head 6$^a$ of the bolt which is seated in a depression or seat 4$^f$ in the hook member prevents a turning of the bolt and the back 5$^c$ of the wedging member provides an enlarged bearing back or abutment against which the supporting or attaching bar 3 may rest. In most cases a rivet-head such as 11 is encountered on the frame end or rail and I therefore form a notch 12 in the bearing back 5$^c$ for the reception of such a rivet-head 11.

When a clamp is adjusted as described on the frame ends 1 it will be seen that the clamp applies pressure in two directions against said frame end and contacts with the said frame end or rail at four points, thus the bill portion of the U-shaped hook member has horizontal and vertical bearing on the upper and outer edge of the flange 1$^c$, while the wedge member has a horizontal bearing on the lower surface of said flange and a vertical bearing upon the web, thus procuring an extremely rigid support. The wedging action is preferably procured by providing the hook member with an internal inclined inner face 4$^g$ on which slides the outer surface of the wedge portion 5$^a$ which has flanges 5$^e$ engaging the bottom surface of the flange 1$^c$, so that a telescoping movement will wedge the two clamp parts against opposite faces of the flange of the frame end, and when the nut is screwed home an edgewise screw-pressure will be exerted on said two clamping parts. The clamp therefore not only applies a wedging pressure against the opposite faces of the flange but simultaneously clamps the flange at opposite edges, applying screw pressure transversely thereof. The clamping action is so firm that two of these clamps with a suitable attaching bar forms a strong, durable and rigid support for a bumper which will not work loose by vibration of the vehicle.

Having described my invention, I claim:—

1. A clamp for supporting automobile bumpers comprising a bumper-supporting member including a supporting-bolt adapted to be connected to the under side of the flange of an automobile channel-bar frame-member and wedging means movable beneath said supporting-bolt for applying a wedging pressure upwardly against said bolt to fasten the same to the frame member.

2. A clamp for supporting automobile bumpers embodying, in combination, a supporting bolt adapted to be connected to the under side of the flange of an automobile channel-bar frame-member and wedging elements movable beneath said bolt and also having a bearing contact with the upper surface of said flange for applying a wedging pressure upwardly against said bolt to fasten the clamp to the frame member.

3. A clamp for supporting automobile bumpers embodying, in combination, a supporting bolt adapted to be connected to the under side of the flange of an automobile channel-bar frame-member, and two wedging elements movable telescopically beneath said bolt, one of which has a bearing contact with the upper surface of said flange for applying a wedging pressure upwardly against said bolt to fasten the clamp to the frame member.

4. A clamp for supporting automobile bumpers embodying, in combination, a bolt member adapted to abut against the under side of the flange of an automobile channel-bar member, a hook member adapted to fit over and partially surround said flange and bolt and having a portion extending downwardly below said bolt member and means cooperating with said downwardly extending portion and movable beneath and in contact with said bolt for applying a wedging pressure upwardly against the same to fasten the clamp to the frame member.

5. A clamp for supporting automobile bumpers embodying, in combination, a bolt member adapted to abut against the under side of the flange of an automobile channel-bar member, a hook member adapted to fit over and partially surround said flange and bolt and having a portion extending downwardly below said bolt member, a wedging element cooperating with said downwardly extending portion and movable beneath said bolt, said bolt having a screw thread and nut for moving said wedging element and downwardly extending portion into telescopic engagement to apply wedging pressure upwardly on said bolt against the lower surface of said flange and simultaneously to apply screw pressure horizontally against the opposite edges of said flange.

6. A clamp for supporting automobile bumpers embodying, in combination, a bolt member, a hook-member cooperative therewith and adapted to fit over one edge of one of the flanges of an automobile channel-bar frame and comprising a bill-portion and a shank-portion extending downwardly beneath said bolt and having a seat for the flange, a wedge member having a portion adapted to telescope below said bolt with said shank portion, one of said members being provided with a wedging incline and the other having a surface engaging the same, said bolt having a screw thread and nut for moving said downwardly-extending shank and wedge member into telescoping engagement to apply wedging pressure upwardly on said bolt against the lower face of the flange and simultaneously to apply screw pressure horizontally and crosswise of said flange.

7. A clamp for supporting automobile bumpers embodying, in combination, a hook-member adapted to fit over one edge of one of the flanges of an automobile channel-bar frame and comprising a bill-portion and a shank-portion having a seat for the flange therebetween, a wedge member having a portion adapted to telescope with said shank portion, one of said members being provided with a wedging incline and the other having a surface engaging the same, and a bolt and nut for moving said members into telescoping engagement to apply wedging pressure by said members against opposite faces of the flange and simultaneously to apply screw pressure horizontally and crosswise of said flange.

8. A clamp for supporting automobile bumpers embodying, in combination, a hook-member adapted to fit over one edge of one of the flanges of an automobile channel-bar frame and comprising a bill-portion and a shank-portion having a seat for the flange therebetween, and also having a grooved portion for the reception of a bolt; a wedge member having a portion adapted to telescope with said shank portion, and provided with a groove for the reception of said bolt, one of said members being provided with a wedging incline and the other having a surface engaging the same, and a bolt and nut for moving said members into telescoping engagement to apply wedging pressure by said members against opposite faces of the flange and simultaneously to apply screw pressure horizontally and crosswise of said flange.

In witness whereof, I have signed my name to the foregoing specification in the presence of two subscribing witnesses.

FRANK GARONE.

Witnesses:
  F. A. WERNIS,
  F. E. COLSON.